US 6,574,102 B2

(12) United States Patent
Usui et al.

(10) Patent No.: US 6,574,102 B2
(45) Date of Patent: Jun. 3, 2003

(54) DOCKING STATION FOR PORTABLE COMPUTER AND DOCKING STRUCTURE THEREOF

(75) Inventors: Hideyuki Usui, Chigasaki (JP);
Akihiko Inoue, Yokohama (JP);
Takashi Yanagisawa, Yokohama (JP);
Masayoshi Nakano, Machida (JP)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 09/823,706

(22) Filed: Mar. 30, 2001

(65) Prior Publication Data

US 2001/0030851 A1 Oct. 18, 2001

(30) Foreign Application Priority Data

Apr. 17, 2000 (JP) ........................................ 2000-115764

(51) Int. Cl.[7] ................................................. H05K 7/20
(52) U.S. Cl. ........................ 361/687; 361/695; 361/725; 165/104.33; 395/281
(58) Field of Search ................................. 361/686, 687, 361/690, 694, 695, 692, 704–712, 697, 725; 165/58, 185, 104.33, 104.32, 104.34; 174/15.1, 52.4, 15.2, 252; 454/184; 395/281, 283, 750.08, 750.01, 700, 750.06; 364/708.1

(56) References Cited

U.S. PATENT DOCUMENTS

| | | | | | |
|---|---|---|---|---|---|
| 5,175,671 A | * | 12/1992 | Sasaki | .......................... | 361/686 |
| 5,592,362 A | * | 1/1997 | Ohgami et al. | ............. | 361/686 |
| 5,704,212 A | * | 1/1998 | Erler et al. | .................... | 62/3.2 |
| 5,738,537 A | * | 4/1998 | Setoguchi et al. | ........... | 439/159 |
| 5,768,101 A | * | 6/1998 | Cheng | .......................... | 361/687 |
| 6,088,620 A | * | 7/2000 | Ninomiya et al. | ............ | 700/16 |
| 6,094,347 A | * | 7/2000 | Bhatia | .......................... | 361/695 |
| 6,151,218 A | * | 11/2000 | Pirdy et al. | .................... | 361/727 |
| 6,219,233 B1 | * | 4/2001 | Moore et al. | ................ | 361/687 |
| 6,239,970 B1 | * | 5/2001 | Nakai et al. | .................. | 361/695 |
| 6,259,601 B1 | * | 7/2001 | Jaggers et al. | ............... | 361/690 |
| 6,275,945 B1 | * | 8/2001 | Tsuji et al. | ................... | 713/300 |
| 6,362,959 B2 | * | 3/2002 | Tracy | .......................... | 361/687 |
| 6,392,880 B1 | * | 5/2002 | Forlenza et al. | ............. | 361/686 |
| 6,437,978 B1 | * | 8/2002 | Ozaki et al. | ................. | 361/687 |
| 6,453,378 B1 | * | 9/2002 | Olson et al. | ................. | 710/304 |

FOREIGN PATENT DOCUMENTS

| JP | 411053063 A | * | 2/1999 | ............. G06F/1/20 |
|---|---|---|---|---|
| JP | 411163567 A | * | 6/1999 | ............. H05K/7/20 |

* cited by examiner

Primary Examiner—Darren Schuberg
Assistant Examiner—Michael Datskovsky
(74) Attorney, Agent, or Firm—Andrew J. Wojnicki, Esq.; Brett M. Hutton, Esq.; Heslin Rothenburg Farley & Mesiti P.C.

(57) ABSTRACT

To provide a docking station for a portable computer, which increases its heat radiation when the docking station is docked with the portable computer. A docking station is equipped with a fan unit at a back portion of a power supply unit within a station body, and a front surface of a connection portion with which a notebook PC is docked is provided with an air suction opening. Thereby, once the fan unit is driven, high temperature air is exhausted from a station body and the connection portion, then outside air is introduced from the suction opening to stimulate the cooling of the connection portion, and the heat which is transferred from a back side portion of the notebook PC to the connection portion is also dissipated there to stimulate the cooling of the notebook PC side.

8 Claims, 8 Drawing Sheets

DOCKING STATION FOR PORTABLE COMPUTER AND DOCKING STRUCTURE THEREOF

PRIOR FOREIGN APPLICATION

This application claims priority from Japanese patent application number 2000-115764, filed Apr. 17, 2000, which is hereby incorporated herein by reference in its entirety.

1. Technical Field

The present invention relates to a docking station for a portable computer which is docked with and mechanically electrically connected to the portable computer to expand the function of the portable computer, and to a docking structure thereof. More particularly, the present invention relates to a docking station for a portable computer which increases the heat radiation in its docking state, and to a docking structure thereof.

2. Background Art

For the purpose of enhancing the function of a portable computer, a docking unit for a computer having a BAY structure (a structure having a housing space capable of housing devices, such as those of fixed-type and of detachable-type) has been known (also known as "a docking station").

Such a docking station for a computer (referred to as merely a docking station hereinafter) includes a power supply unit and mounts, for example, a device having a SCSI (Small Computer System Interface: a peripheral unit interface for a small computer), a device having IDEs (Integrated Device Electronics; a kind of a disc drive interface) as an interface, and an AT bus card (a substrate on which an extended bus is formed) which is able to connect communication devices etc., thus the docking station is also an expansion unit which may provide the portable computer having functions equal to a desktop computer level.

FIG. 8 shows a conventional and general docking station, with which a notebook personal computer (referred to as a notebook PC hereinafter) is docked as a portable computer.

A docking station 100 is a box-type which is shaped like an almost L letter, a front side of an upper portion of a station body which is shaped downwardly stepwise becomes a support surface 102 on which a notebook PC 120 is placed. The notebook PC 120 placed on the support surface 102 in an illustrated direction is subsequently pushed toward a back side of the docking station 100 (in a direction of an arrow A in this figure), that is, the notebook PC 120 moves along guides 104 on the support surface 102 to connect to an interface connector 106 so as to dock with the docking station 100.

A docking station having such a structure is described, for example, in Published Unexamined Patent Application Nos. 4-291028, 8-6668, and 9-97125 or the like.

In a recent notebook PC, a CPU which operates at high clock frequencies increases an electric power consumption, and also increases heating values within the PC as the electric power consumption increases. At the time of using the PC for image processing of moving pictures etc., a memory etc. on board of a graphical card also reaches to substantially high temperature since the data capacity which is larger than before is transferred and processed at high speed, so that the memory etc. can not be ignored as a heat source.

For the notebook PC, which may expand its graphical function, docked with the docking station which is equipped with such a graphical card, it is required to take further countermeasures against the heat because the PC and the docking station will generate high-temperature heat to each other.

High temperature within the PC reduces the speed of CPU and affects the CPU performance, since the notebook PC usually manages an operation of the system by detecting the temperature within the PC using a temperature sensor (namely, thermal management). However, as the notebook PC is equipped with thermal attachments such as fans for air-cooling the CPU and heat pipes for facilitating the cooling, it becomes easy to take countermeasures against the degradation, if limited to the PC alone, caused by heat generation.

However, in a state of mounting on the docking station as can be seen in FIG. 8, an almost entire portion of a bottom surface of the notebook PC is in contact with the support surface 102 of the docking station 100, so that the heat radiation from the PC bottom surface is extremely decreased. Therefore, even the thermal attachments would not prevent the temperature rise at that contacting portion, and the docking station side would also be affected by the heat. Consequently, there is a problem of causing a degradation in the whole system performance.

SUMMARY OF THE INVENTION

A purpose of the present invention, taking the above described facts into consideration, is to provide a docking station for a portable computer which is intended to increase the heat radiation in its docking state of the portable computer and its docking station, and to improve the performance which has been degraded by heat from the portable computer, and a docking structure thereof.

One aspect of the present invention to attain the above described purpose is a docking station for use with a portable computer, mechanically and electronically connected with the portable computer to expand the function of the portable computer, including: a station body being an almost sealed structure, containing a power supply unit and an device to expand a function of the portable computer; a connection portion provided in the station body, a front end portion of a bottom surface of the portable computer being supported on a placing surface at which the docking station for the portable computer is placed, and a back end portion of the bottom surface being supported in a position lifted from the placing surface for mechanically and electrically connecting a part of the back end portion thereto; an air intake provided at the connection portion to communicate an outside with an inside of the connection portion; and a fan unit for exhausting air inside of the connection portion and the station body, being communicated with the air suction opening through the insides of the connection portion and the station body.

In the above described docking station for use with the portable computer, a part of the back end portion of the bottom surface of the portable computer is mechanically and electrically connected to the connection portion of the station body so that both of them are docked with each other. The portable computer takes a position lifted from the placing surface, in which a front end portion of the bottom surface is supported on the placing surface on which the docking station for the portable computer is placed, and a back end portion of the bottom surface is supported by connecting a part of the back end portion to the above described connection portion. Thus, a space is formed between the bottom surface portion of the portable computer and the placing surface.

Once the portable computer and its docking station are operated in such a docking state, the fan unit is driven to exhaust a warmed air from the station body which is an almost sealed structure and from the connection portion. With the exhaustion, air from the outside is admitted into the connection portion and into the station body through the suction opening.

Thereby, this configuration stimulates the cooling of the connection portion in addition to the cooling of the electronic devices mounted within the station body. Further, the cooling for the portable computer side is also stimulated since the heat transferred from the back end portion of the portable computer to the connection portion is also radiated there. And yet at a non-contacting portion of the bottom surface of the portable computer, the heat radiation is increased by convection of air. Therefore, the heat will not remain at the bottom surface of the portable computer even in a docking state, the degradation of the system performance caused by the heat can be avoided.

Furthermore, a suction opening provided in the connection portion may be disposed to be located between the bottom surface of the portable computer and the placing surface of the portable computer and the docking station for use with the portable computer.

Thereby, air in the space formed between the bottom surface of the portable computer and the placing surface is sucked from the suction opening, and air at the surface of the portable computer is to be circulated forcefully. Thus, the heat radiation at the bottom surface will more increase.

Moreover, the inside of the connection portion may be a duct structure, this structure increases the volume of air flowing from the suction opening into the connection portion, and further stimulates the cooling of the connection portion.

Also, a connector for electrically connecting the portable computer provided in the connection portion may be adapted to attach to a chassis member provided within the connection portion.

For this chassis member, a metallic shield plate, for example, disposed against EMI (Electro Magnetic Interference) is available. In this case, the heat transferred to the electrical connecting connector, which is a portion of the heat generated from the portable computer, is further transferred from the connector to the chassis member. However, a chassis member made of a sheet metal rapidly diffuses and radiates the heat and is located within the connection portion to be cooled by air which is flowing within the connection portion, so that a thermal conductivity of an entire connection portion is improved and provides a larger amount of heat radiation.

Also, one embodiment of the present invention is a docking structure for docking a portable computer with a docking station for the portable computer which expands the function of the portable computer through their mechanical and electrical connection, comprising providing a station body, which is an almost sealed structure containing a power supply unit and an electronic device for expanding the function of the portable computer, with a connection portion having an air suction opening allowing the communication of an outside and an inside of the station body, and with a fan unit communicated to the air suction opening through the inside of the connection portion and the inside of the station body for exhausting air inside the connection portion and inside the station body; and supporting a front end portion of a bottom surface of the portable computer on a placing surface on which the docking station for the portable computer is placed, and supporting a back end portion of the bottom surface in a position lifted from the placing surface to dock a part of the back end portion with the connection portion.

A docking structure according to the present invention comprising docking the portable computer with the above described docking station for the portable computer.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
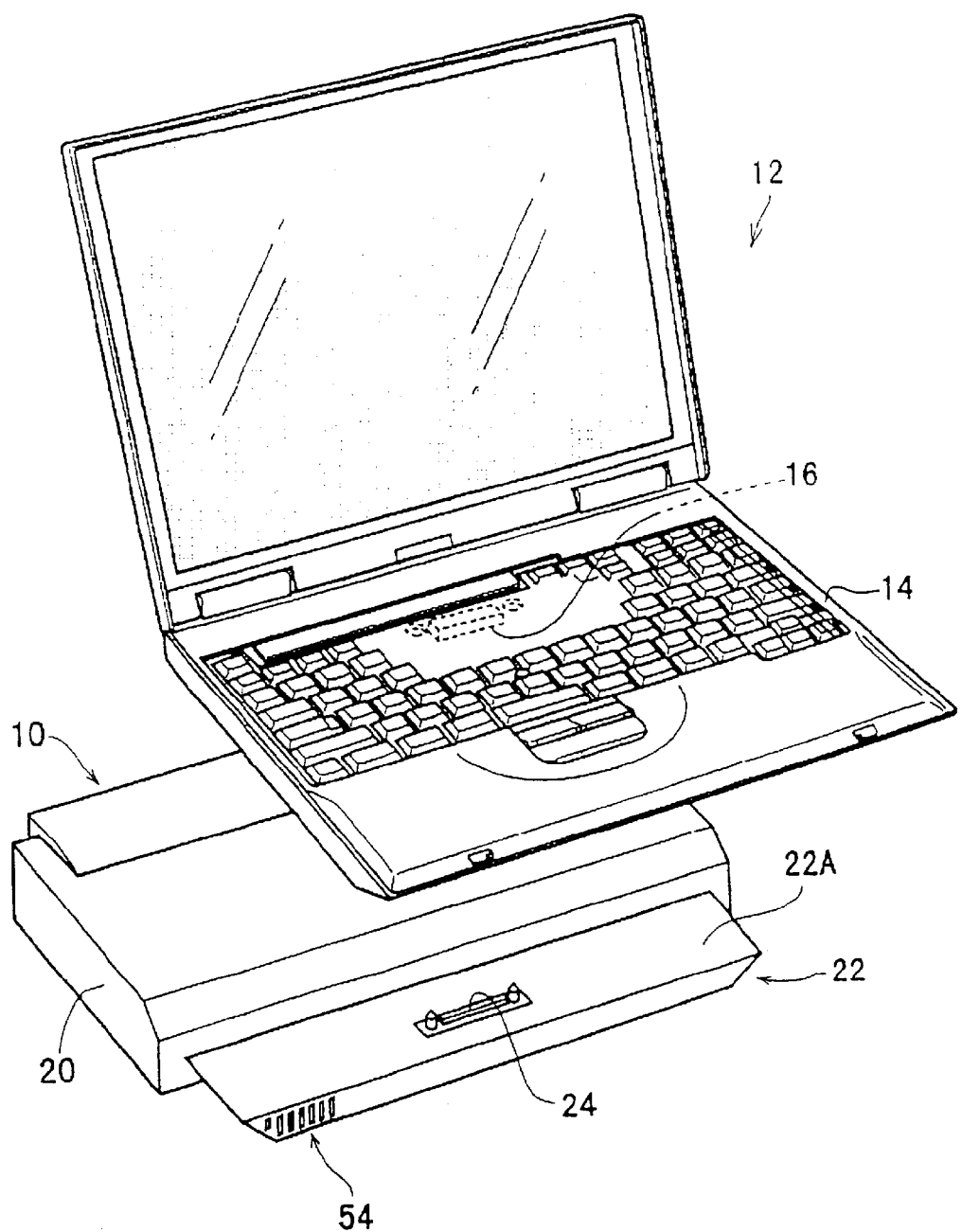
FIG. 1 is an outside drawing showing a docking station and a notebook PC according to an embodiment of the present invention.

An embodiment of the present invention will be described as follows referring to the drawings.

FIG. 1 shows a docking station 10 and a notebook personal computer 12 (hereinafter, a notebook PC 12) according to an embodiment of the present invention.

As shown in FIG. 1, the docking station 10 is configured by a station body 20 which includes a power supply unit and electronic devices etc. and effects expanding of the function of the notebook PC 12, and a connection portion 22 which is formed outstanding from the front portion of the station body 20 and with which the notebook PC 12 is docked.

An upper surface of the connection portion 22 is lowered by one step than the upper surface of the station body 20 to form a support surface 22A on which the bottom surface of the PC body 14 of the notebook PC 12 is to be placed. An almost middle portion of the support surface 22A is equipped with an interface connector 24 for electrically connecting to the notebook PC 12 the terminal portion of which is directed upward.

On the other hand, a back end portion of the bottom surface of the notebook PC 12 is equipped with an interface connector 16 which is paired with the interface connector 24, in a direction which can be engaged with the connector 24.

Figure 2:
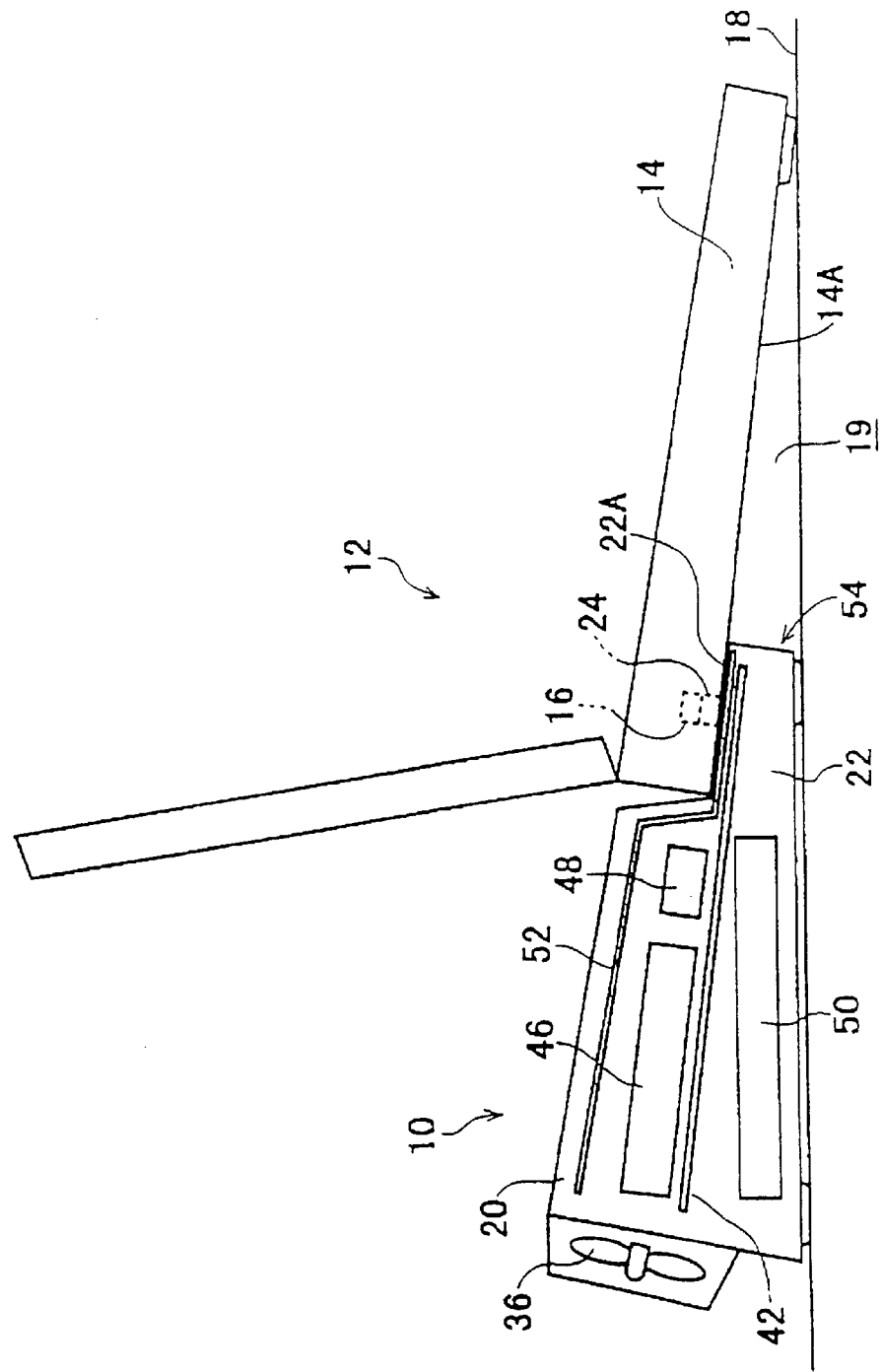
FIG. 2 is a side view showing a schematic internal configuration of the docking station according to an embodiment of the present invention.

As shown in FIG. 2, when the docking station 10 is set on an almost horizontal placing surface 18, the support surface 22A is inclined downward at a predetermined angle toward its front portion, and when the notebook PC 12 is docked with the station 10, the station supports the back end portion of the bottom surface 14A in a position in which the front end portion of the bottom surface 14A of the PC body 14 is supported on the placing surface 18. This docking state forms a space 19 between the bottom surface 14A of the PC body 14 and the placing surface 18.

Figure 3:
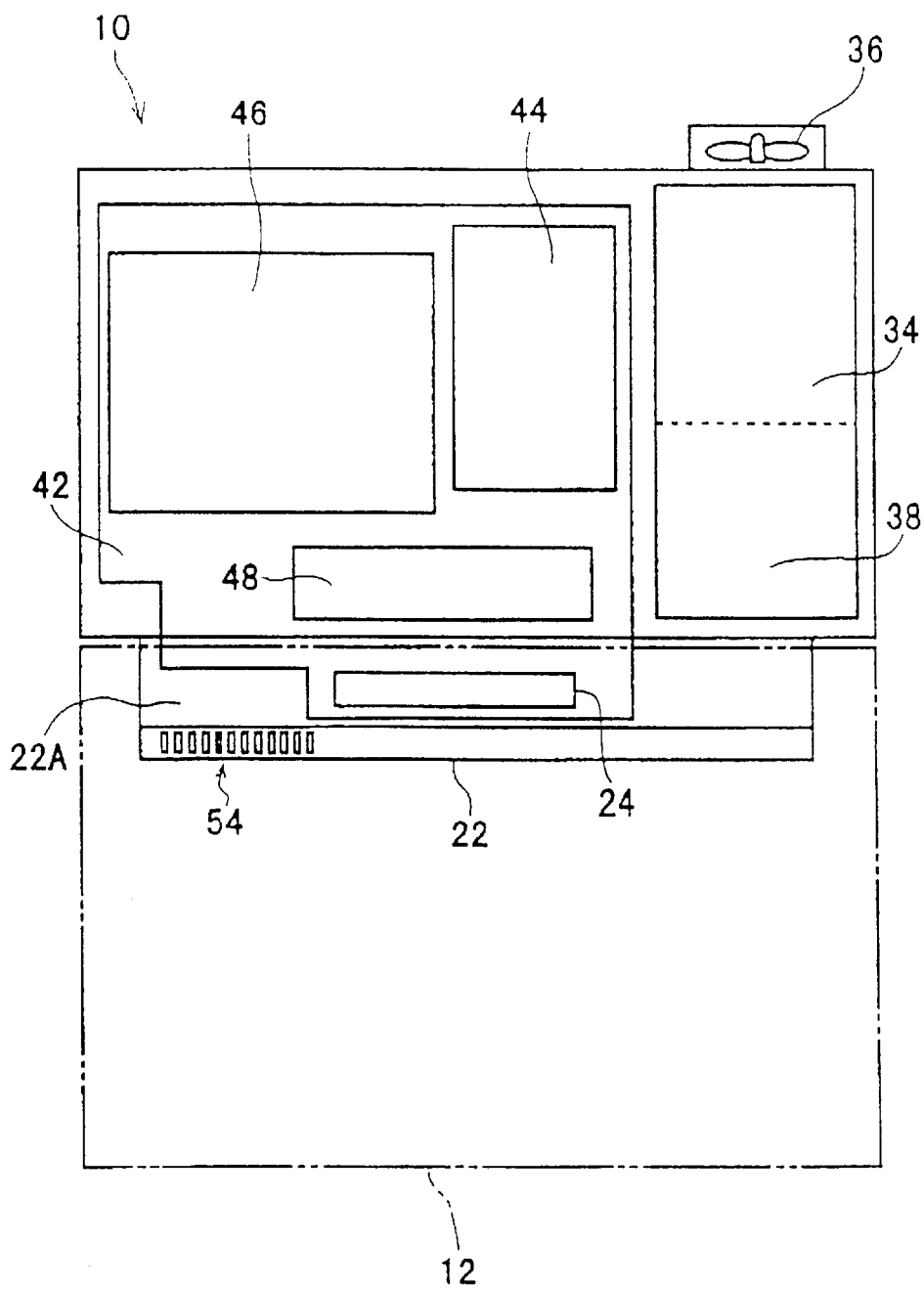
FIG. 3 is a plan view showing a schematic internal configuration of the docking station according to an embodiment of the present invention.
Figure 4:
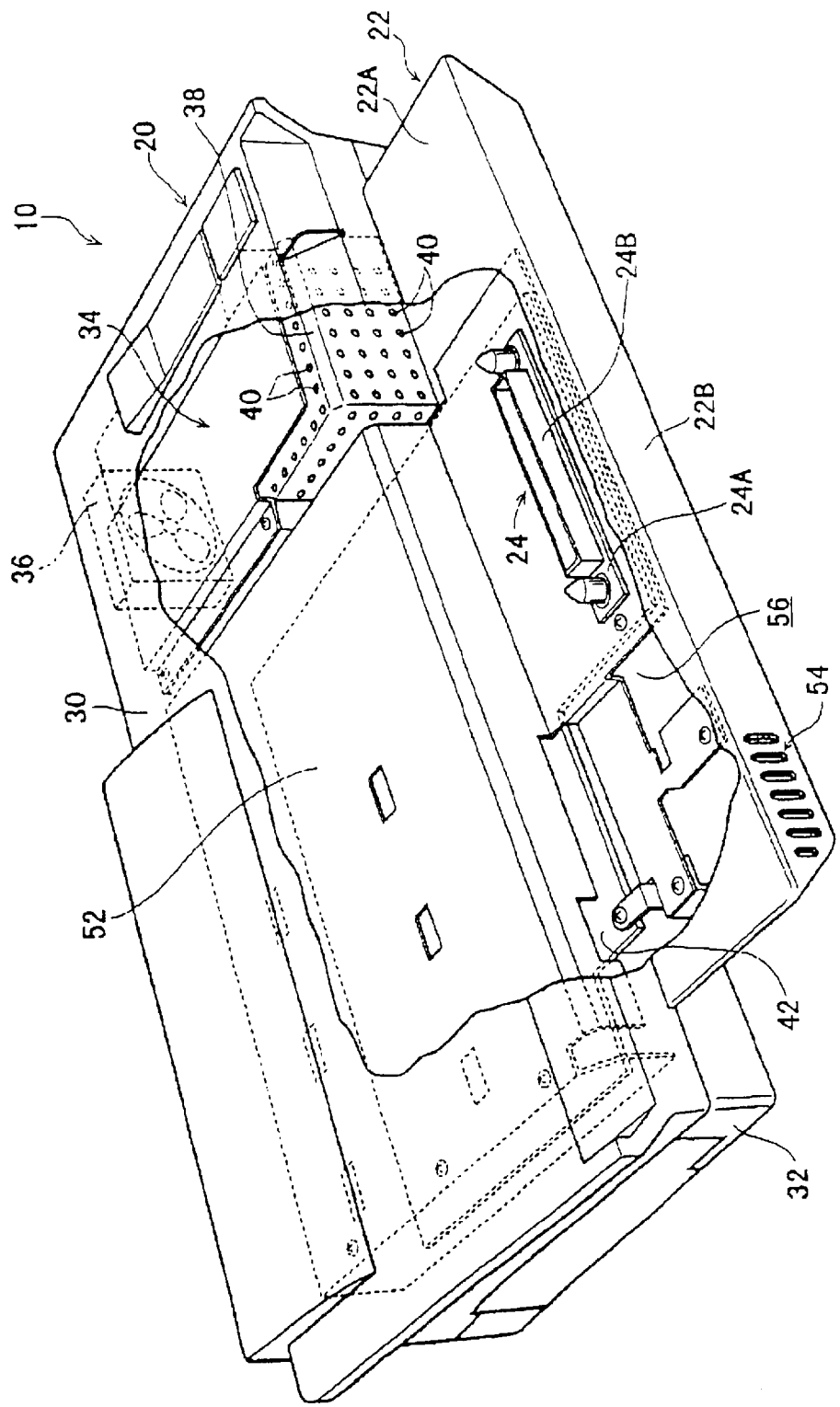
FIG. 4 is a perspective view showing a schematic internal configuration of the docking station according to an embodiment of the present invention.

The docking station 10 will next be described in detail. FIGS. 2 to 4 show internal structures of the docking station 10. An outer housing of the station body 20 and a connection portion 22 is configured by housings 30 and 32 which are able to be divided into an upper part and a lower part.

The outer housing portion of the station body 20 side configured by the housings 30 and 32 is made so that the fitted portion between the both housings being combined with each other has almost no gaps, and resulted in an almost sealed structure.

At a right side portion within the station body 20, a power supply unit 34 is disposed for operating this station by supplied power. The back portion of the power supply unit 34 is equipped with a fan unit 36 for exhausting the station body, and a plurality of holes 40 are drilled in a flame 38 (made of aluminium) which is disposed at the front portion of the unit. Thus, driving the fan unit 36 propels an airflow within the station, which comes from the front side of the power supply unit 34 into the unit is exhausted to the backside of the unit.

At a left side of the power supply unit 34, a system substrate 42 is disposed so that the inside of the station body 20 is partitioned into an upper part and a lower part. A PC card slot 44, a PCI adapter 46 (small type), and a DC/DC converter 48 or the like are mounted within an upper space of the system substrate 42, while a PCI adapter 50 (standard type) or the like are mounted within a lower space of the substrate.

In addition, a front portion of the system substrate 42 protrudes into the connection portion 22, and the aforementioned interface connector 24 is mounted on an upper surface of the front portion to be electrically connected to the system substrate 42.

Further, the upper portion of the system substrate 42 is equipped with a sheet metal chassis 52 which is formed to pack the PC card slot 44 and the PCI adapter 46 or the like all of which are located on the upper portion of the substrate.

The sheet metal chassis 52 functions as a shield plate for suppressing the electromagnetic interference (unwanted emission) of each electronic device on-board within the station body 20, a mold housing 24A of the interface connector 24 is fixed to this sheet metal chassis 52, and a GND terminal portion communicating to a metal shell portion 24B is electrically connected.

On the other hand, the connection portion 22 is provided with a suction opening 54 which is configured from a plurality of vertical slits at the left end portion of the front surface 22B, and allows the outside of the station to communicate with the inside of the connection portion 22 and the inside of the station unit 20.

An inside 56 of the connection portion 22 configured by housings 30 and 32 is hollow like a duct, so that the air stream, which flows from the suction opening 54 the flame 38 located at the front portion of the power supply unit 34, will not be disturbed.

Figure 5:
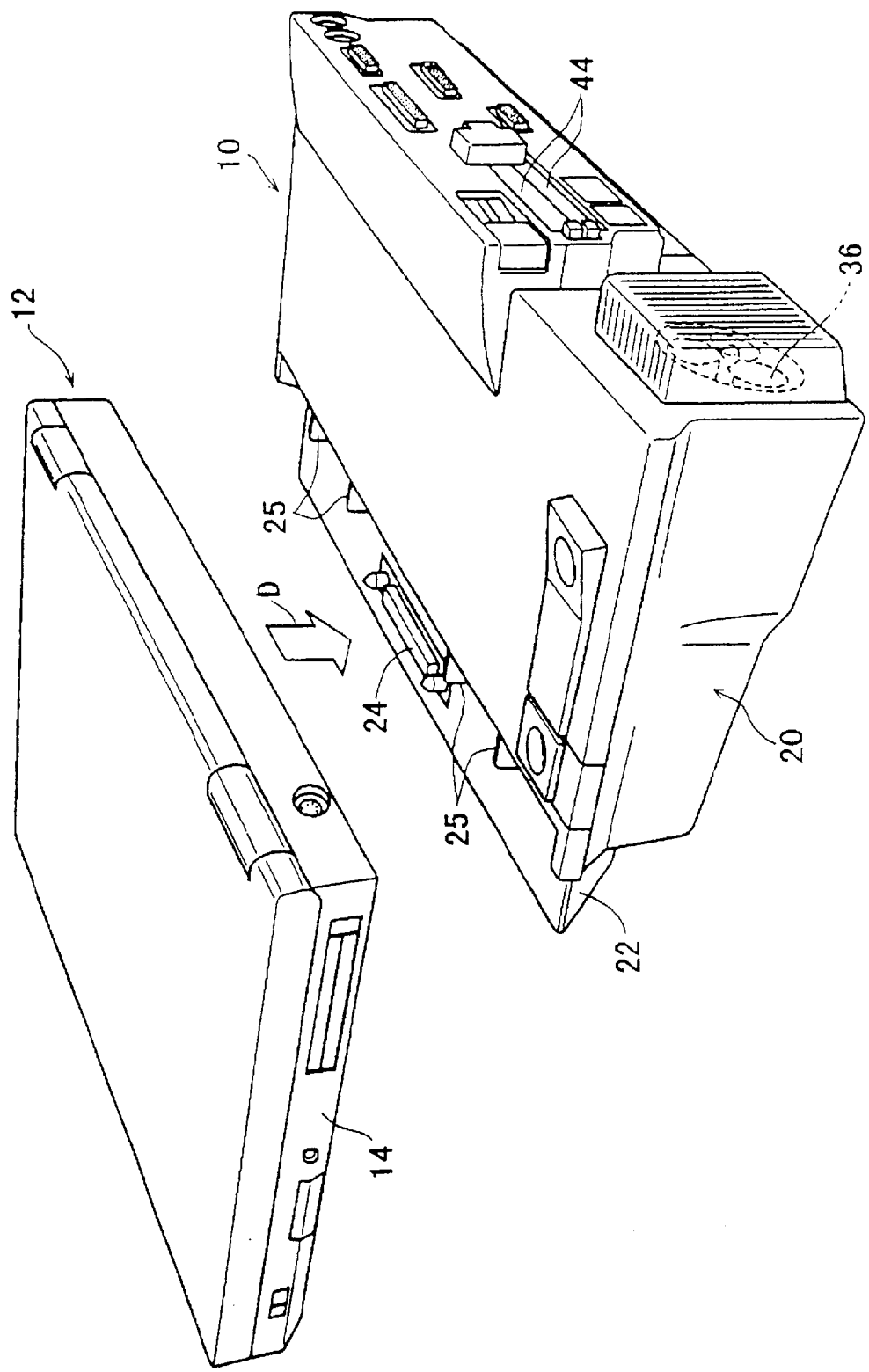
FIG. 5 is a perspective view of the docking station, which is viewed from a backward side, in a state of docking with the notebook PC, according to an embodiment of the present invention.

An operation of the embodiment of the present invention will now be described. FIG. 5 shows a perspective view of a docking station 10, viewing from its backward, which is to be docked with the notebook PC 12.

As shown in this figure, a back end side of the notebook PC 12 is registered to the connection portion 22, and the PC 12 is pushed in a direction of an arrow D in this figure, along the guides 25 provided on the support surface 22A, so as to connect the both connectors for docking them.

In this case, a latch of the support surface 22A, which is not shown in this figure, engages to a notch portion formed on the bottom surface of the PC body 14 to hold the notebook PC 12. This provides a mechanical and electrical connection between the notebook PC 12 and the docking station 10 and expands the function of the notebook PC 12. In the case where the PC 12 is undocked, an inject button which is provided at a side end portion of the upper surface of the station body 20 is manipulated to unlock the engagement of the latch, and at the same time, a push-up pin (not shown) protrudes from the support surface 22A and pushes up the bottom surface of the notebook PC 12 to unlock the connector link, consequently the notebook PC 12 can be easily removed from the docking station 10 by lifting the PC 12 up in such a state.

Figure 6:
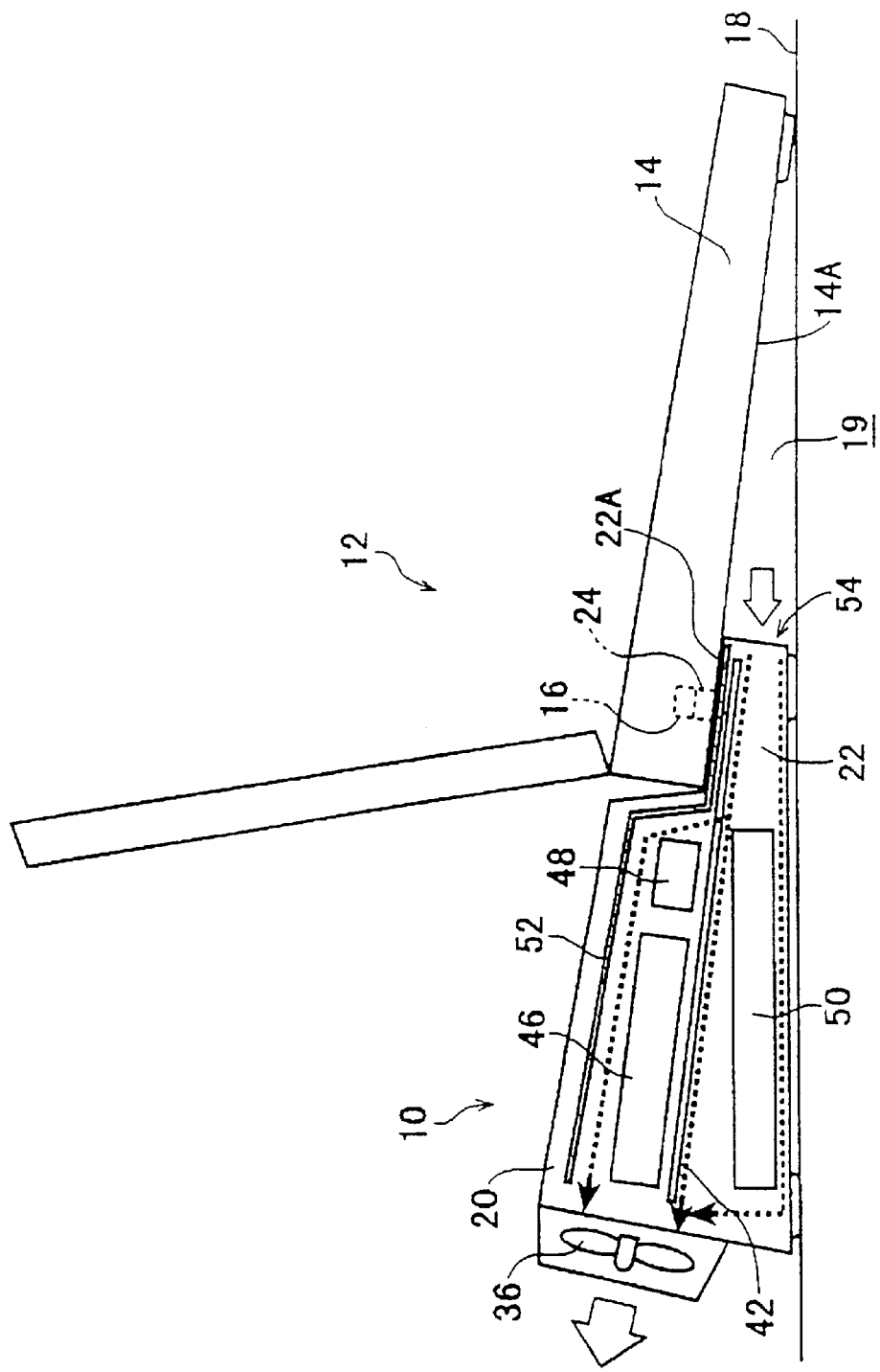
FIG. 6 is a side view of the docking station with which the notebook PC is docked wherein an airflow is systematically depicted, according to an embodiment of the present invention.
Figure 7:
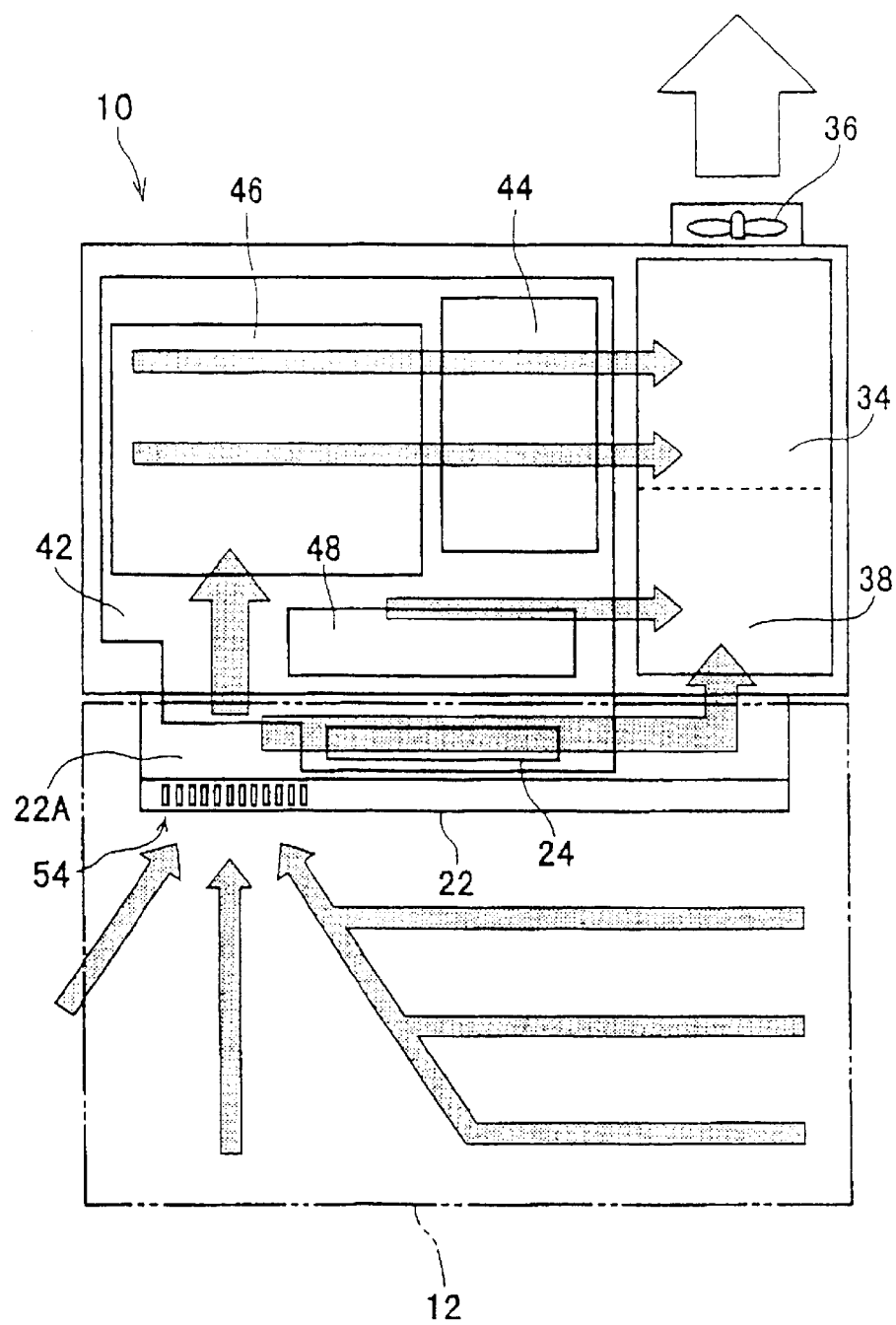
FIG. 7 is a plan view of the docking station with which the notebook PC is docked wherein an airflow is systematically depicted, according to an embodiment of the present invention.
Figure 8:
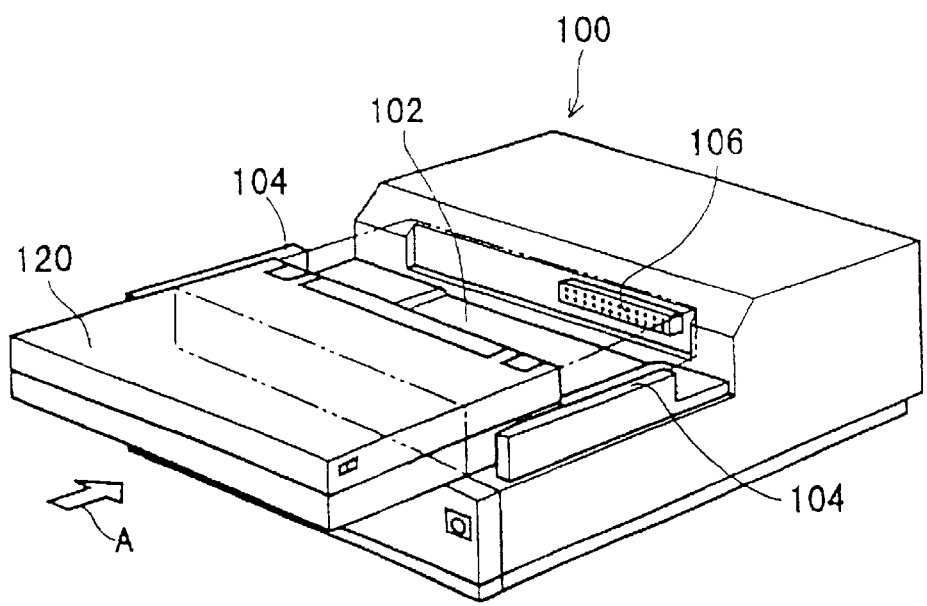
FIG. 8 is an outside drawing showing a state in which the notebook PC is docked with a background art docking station.

According to the above mentioned docking state, the fan unit 36 which operates the notebook PC 12 and the docking station 10 drives, as shown in FIGS. 6 and 7, the high temperature air within the station body 20 and the connection portion 22 will be exhausted backward of the station. At the same time, outside air comes from the suction opening 54 to cause an air flow as depicted by an arrow in the picture, and results in a cooling of the power supply unit 34 and each electronic device etc.

Regarding air coming from the suction opening 54 into the connection portion 22, the amount of air (air volumes) flowing into the connection portion 22 which is made into a duct structure becomes larger than the amount of the air flowing into the station body 20 side in which a channel is obstructed by the electronic devices etc., consequently the heat radiation within the connection portion 22 increases. The airflow is also generated between the bottom surface 14A of the notebook PC 12 and the placing surface 18, so that the heat radiation at the bottom surface 14A also increases.

Since each block within the station body is not completely partitioned, besides the primary airflow which is systematically depicted by an arrow in this figure, a small amount of airflow (turbulent flow) passing through the gaps between each portion is generated, so that the air coming from the suction opening 54 and other gaps is distributed throughout the inside of the station body.

As described above, in a docking station 10 according to the embodiment of the present invention, once a fan unit 36 drives in a docking state with the notebook PC 12, high temperature air is exhausted from the station body 20 which is made into an almost sealed structure and from the connection portion 22. This allows the outside air from the suction opening 54 to be introduced into the connection portion 22 and into the station body 20.

Therefore, the cooling of the connection portion 22 in addition to the power supply unit 34 and electronic devices within the station body 20 is also stimulated, and the heat which is transferred to the connection portion 22 from the back end portion of the notebook PC 12 is also radiated at the connection portion 22, so that the cooling of the notebook PC 12 side is also stimulated.

Further, in this embodiment, a suction opening 54 provided in the connection portion 22 is disposed at the front surface 22B of the connection portion so as to be located between the bottom surface 14A of the notebook PC 12 and the placing surface 18. Therefore, air within a space 19 is sucked from the air opening 54 to be forcefully circulated, and the heat radiation at the bottom surface 14A of the notebook PC 12 also increases.

Therefore, the heat does not accumulate on the bottom surface 14 of the notebook PC 12 and on the support surface 22A of the docking station 10 even when they are in docking state, the performance degradation of the whole system caused by the heat can be prevented.

As for the connection portion 22 of this embodiment, since the inside 56 of the connection portion 22 is a duct structure, the air volume flowing from the suction opening 54 into the connection portion 22 becomes larger and stimulates the cooling of the connection portion 22.

According to this embodiment, since an interface connector 24 is attached to the sheet metal chassis 52, the heat transferred from the notebook PC 12 to the interface connector 24 is further conducted to the sheet metal chassis 52. Therefore, the thermal diffusion and the heat dissipation are effected rapidly, and the sheet metal chassis 52 is air-cooled by airflow within the connection portion 22, consequently, the heat conduction throughout the connection portion 22 becomes favorable and the more significant heat radiation can be effected.

Although the present invention has been described based on the embodiments, the subject of the present invention is not limited to the scope of the embodiments and is determined based on the description of the claims.

According to the docking station for a portable computer of the present invention, which is configured as described above, the heat radiation in the docking state of the portable computer and the docking station increases, the degradation caused by the heat from the portable computer will be improved.

What is claimed is:

1. A docking station for a portable computer with a bottom surface, mechanically and electrically connected to the portable computer to expand function of said portable computer, comprising:

a station body, being an almost sealed structure, having a power supply unit and electronic devices to expand the function of said portable computer;

a connection portion provided in said station body, a front end portion of the bottom surface of said portable computer being supported on a placing surface at which the docking station for the portable computer is placed and a back end portion of said bottom surface being supported in a position lifted from said placing surface for mechanically and electrically connecting a part of said back end portion thereto; and an air intake disposed in said connection portion between said bottom surface and said placing surface, to communicate an outside with an inside of the connection portion.

2. The docking station for a portable computer according to claim 1, wherein the inside of said connection portion is formed to be a duct structure.

3. The docking station for a portable computer according to claim 2, wherein a chassis member is provided within said connection portion, and a connector for electrically connecting to said portable computer which is provided at the connection portion is attached to said chassis member.

4. The docking station for a portable computer according to claim 1, wherein the inside of said connection portion is formed to be a duct structure.

5. The docking station for a portable computer according to claim 1, wherein a chassis member is provided within said connection portion, and a connector for electrically connecting to said portable computer which is provided at the connection portion is attached to said chassis member.

6. A docking structure for docking a portable computer with a docking station for the portable computer which expands the function of the portable computer through their mechanical and electrical connection, comprising:

providing a station body, which is an almost sealed structure containing a power supply unit and an electronic device for expanding the function of said portable computer, with a connection portion having an air suction opening allowing the communication between an outside and an inside of said station body, and with a fan unit communicated to said air suction opening through the inside of said connection portion through the inside of said station body for exhausting air inside the connection portion and inside the station body; and supporting a front end portion of a bottom surface of said portable computer on a placing surface on which the docking station for the portable computer is placed, and supporting a back end portion of said bottom surface in a position lifted from said placing surface to dock a part of the back end portion with said connection, wherein the air suction opening is located between the bottom surface and the placing surface.

7. The docking station for a portable computer according to claim 1 further comprising a fan unit for exhausting air inside of the connection portion and the station body, being communicated with said air intake through the insides of said connection portion and said station body.

8. A docking station for a portable computer with a bottom surface, mechanically and electrically connected to the portable computer to expand function of said portable computer, comprising:

a station body, being an almost sealed structure, having a power supply unit and electronic devices to expand the function of said portable computer;

a connection portion provided in said station body, a front end portion of the bottom surface of said portable computer being supported on a placing surface at which the docking station for the portable computer is placed and a back end portion of said bottom surface being supported in a position lifted from said placing surface for mechanically and electrically connecting a part of said back end portion thereto, wherein the bottom surface of the portable computer, the placing surface and a portion of the connection portion form a space for air to flow; and an air intake to communicate an outside with an inside of the connection portion, said air intake provided at the portion of said connection portion that forms the space for air to flow between the bottom surface of the portable computer and the placing surface.

* * * * *